F. MUELLER.
HOISTING GEARING FOR MOTOR TRUCKS.
APPLICATION FILED OCT. 16, 1912.
1,138,004.
Patented May 4, 1915.
4 SHEETS—SHEET 2.
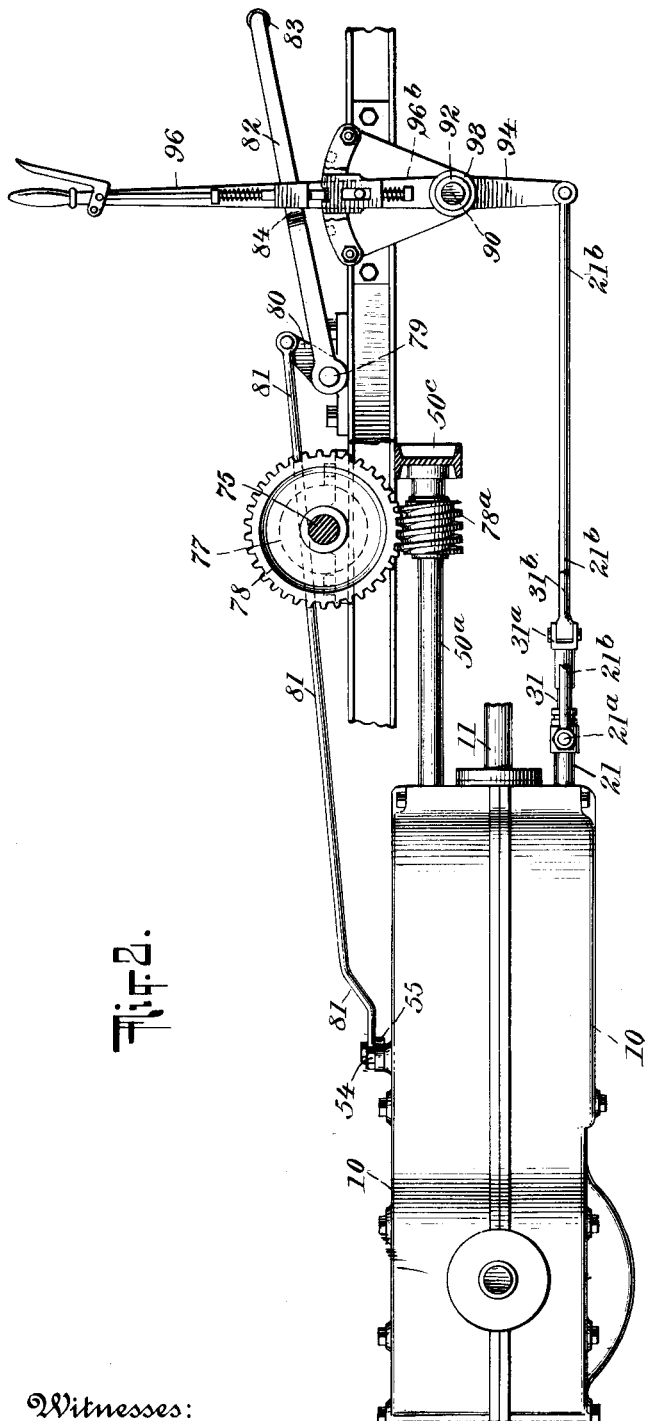
Witnesses:
Inventor
FRANK MUELLER
By Conrad A. Dieterich
his ATTORNEY

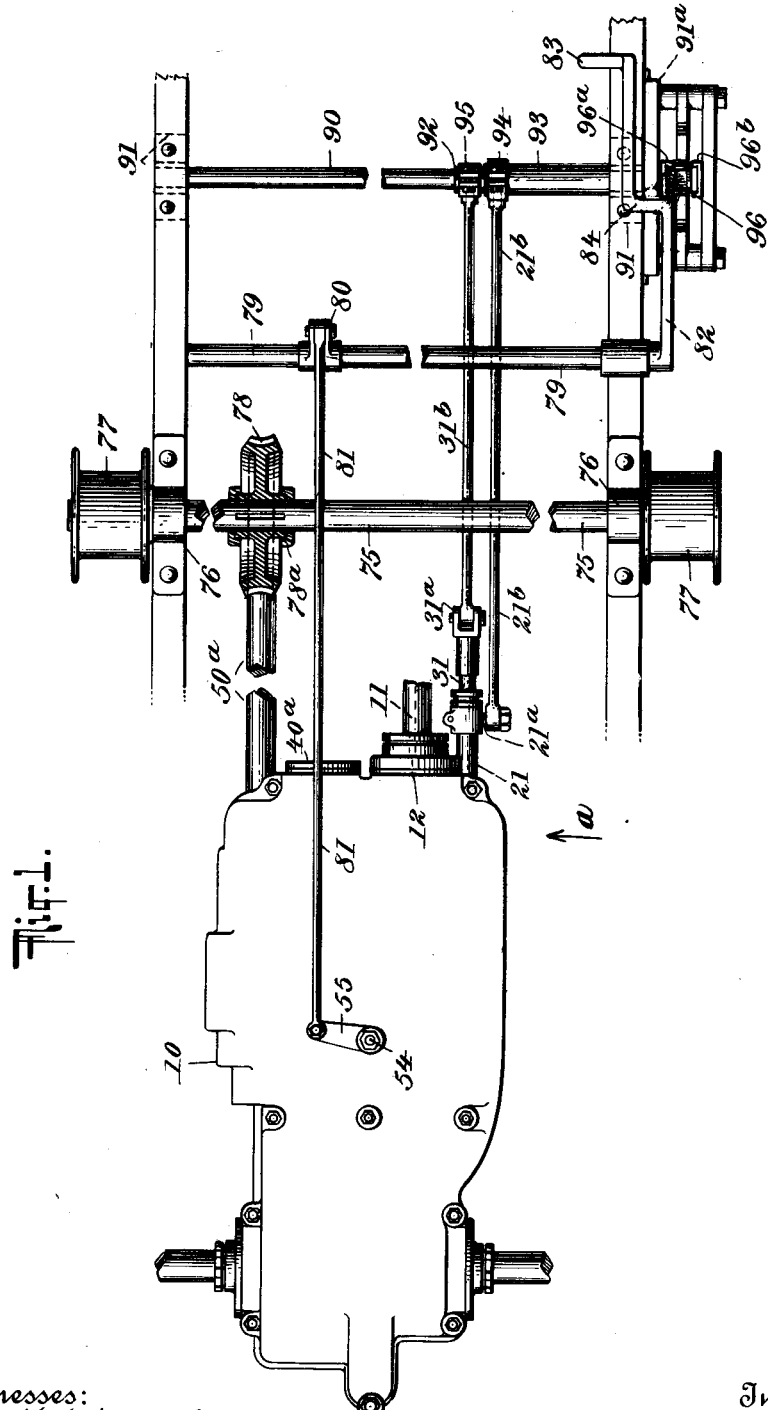

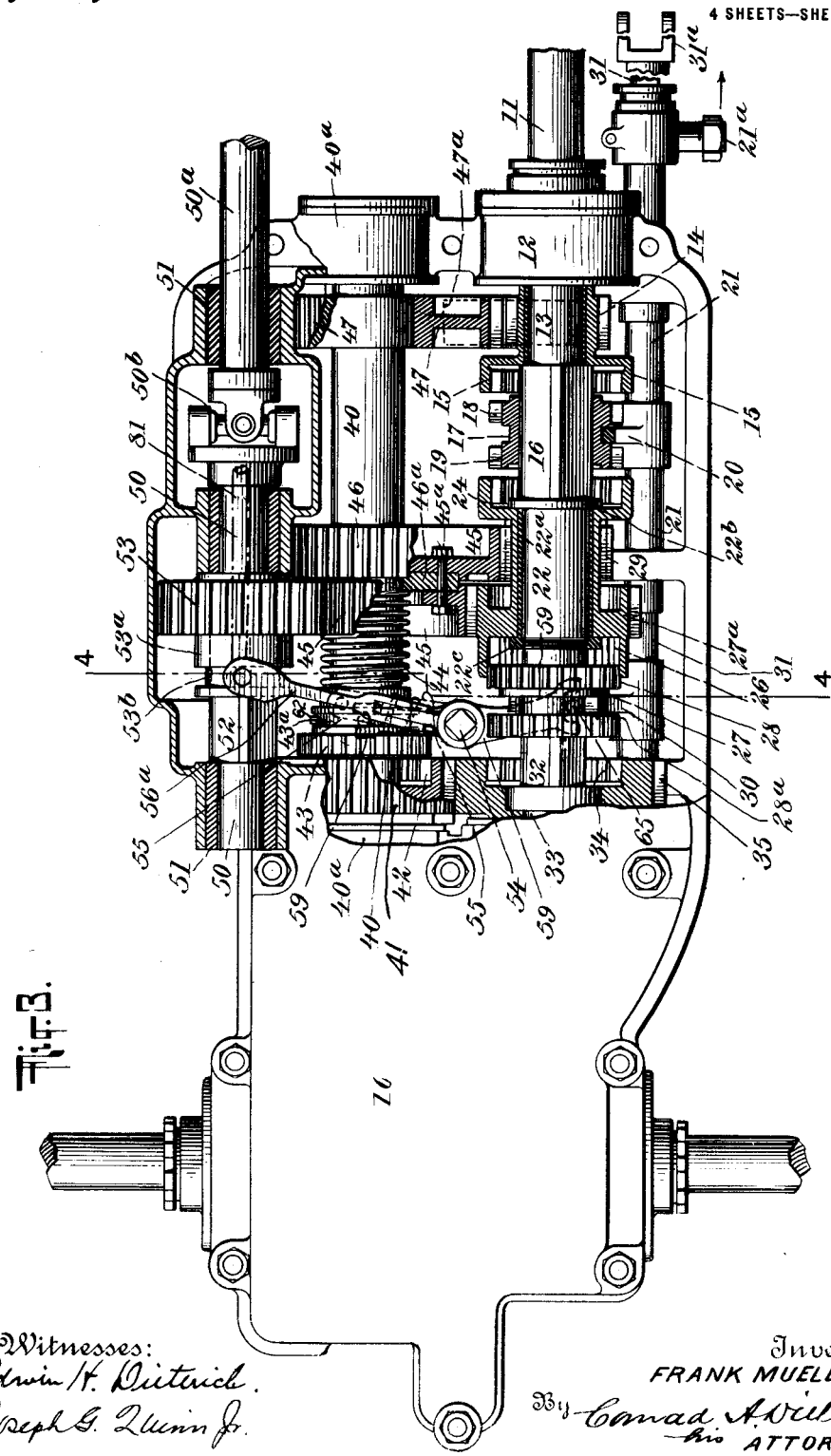

F. MUELLER.
HOISTING GEARING FOR MOTOR TRUCKS.
APPLICATION FILED OCT. 16, 1912.
1,138,004.
Patented May 4, 1915.
4 SHEETS—SHEET 4.
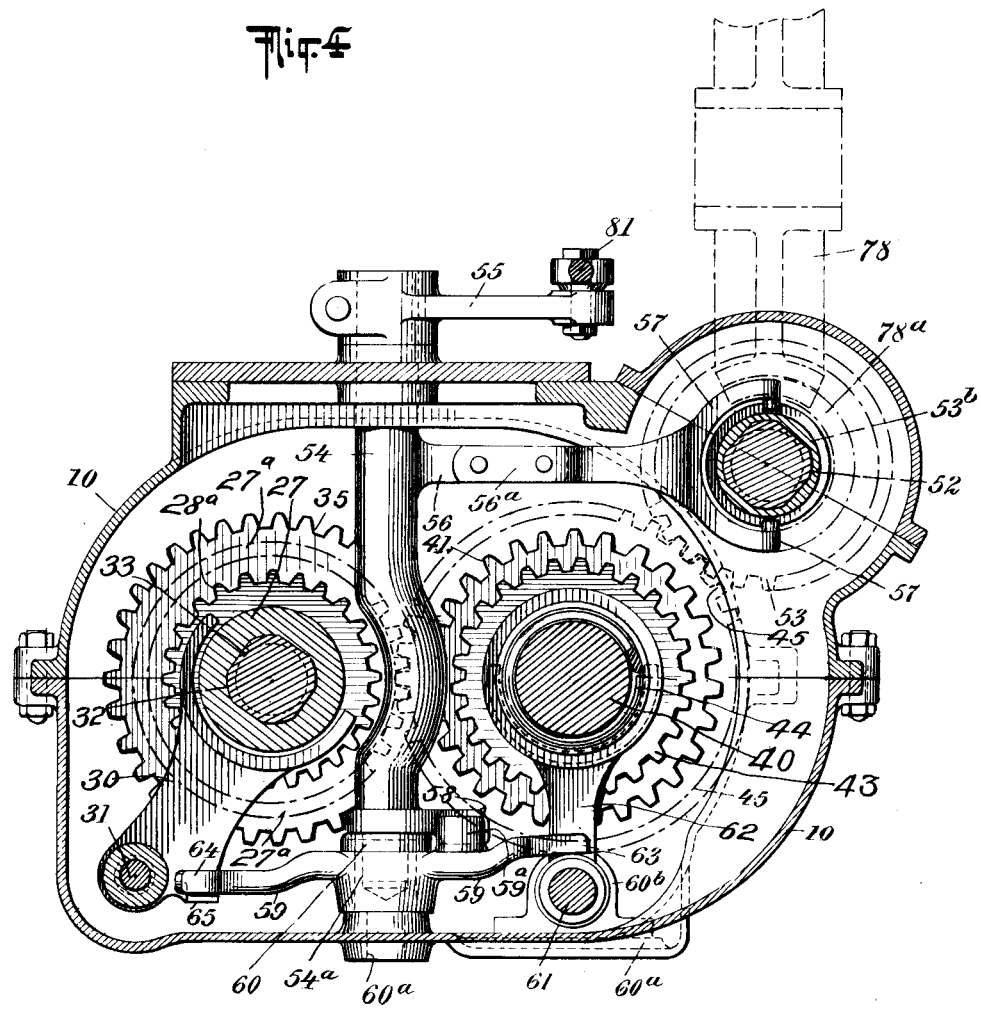
WITNESSES
INVENTOR
FRANK MUELLER
BY
ATTORNEY

UNITED STATES PATENT OFFICE.

FRANK MUELLER, OF ALLENTOWN, PENNSYLVANIA, ASSIGNOR TO INTERNATIONAL MOTOR COMPANY, OF WILMINGTON, DELAWARE, A CORPORATION OF DELAWARE.

HOISTING-GEARING FOR MOTOR-TRUCKS.

1,138,004.          Specification of Letters Patent.          Patented May 4, 1915.

Application filed October 16, 1912. Serial No. 726,028.

*To all whom it may concern:*

Be it known that I, FRANK MUELLER, a citizen of the United States, residing at Allentown, Lehigh county, Pennsylvania, have invented certain new and useful Improvements in Hoisting-Gearing for Motor-Trucks, of which the following is a full, clear, and exact specification.

My invention relates to improvements in hoisting mechanism for motor trucks, and the same has for its object more particularly to provide a simple, efficient and reliable hoisting mechanism which is operated through, and in combination with the transmission mechanism of the vehicle, and which is also capable of being controlled by the same operating levers which control the speed and direction of travel of the vehicle.

Further said invention has for its object to provide a hoisting mechanism adapted to be operated through and in combination with a transmission mechanism of the character shown and described in United States Letters Patent No. 954,531, dated March 15, 1910, and granted to John M. Made, for improvements in transmission mechanism.

Further said invention has for its object to provide a hoisting mechanism, which may be operated or controlled by the same means which serves to control the speed or direction of travel of the vehicle in such a manner that only certain parts of the transmission mechanism may be operatively connected with said hoisting mechanism, and at the same time other parts thereof positively locked against operative connection with said hoisting mechanism.

Further said invention has for its object the provision of additional mechanism whereby certain portions of the transmission mechanism may be thrown out of operation when the truck is not in motion and the power generated by the motor transmitted through certain portions of the mechanism to the extra shaft in gear with a transverse shaft to the ends of which are secured the hoisting drums to receive the cable by means of which an article may be hoisted or lowered.

Further said invention has for its object to provide a construction whereby the first, second and reverse gears of the transmission may be disconnected from the driving mechanism of the vehicle, and the motor then used in combination with said first, second and reverse gears to operate the hoisting mechanism.

Further said invention has for its object to provide a construction in which a locking lever is employed to bring the mechanism controlling the first, second and reverse gears into operative position to be actuated by the transmission lever, and at the same time to lock said transmission lever against connection with the high speed gear of the transmission.

To the attainment of the aforesaid objects and ends, my invention consists in the novel details of construction, and in the combination, connection and arrangement of parts hereinafter more fully described, and then pointed out in the claims.

In the accompanying drawings, forming part of this specification, where like numerals of reference indicate like parts,— Figure 1 is a diagrammatic plan view showing a portion of a motor truck frame, the transmission, the operating levers for the transmission and the hoisting mechanism; Fig. 2 is a side view looking in the direction of the arrow a, Fig. 1; Fig. 3 is an enlarged top view partly broken out and in section showing the transmission with the hoisting mechanism therein, and Fig. 4 is a transverse section taken on the line 4—4 of Fig. 3.

In said drawings 10 designates the transmission casing within which is mounted a main shaft 11 which is connected at its right hand end with the engine.

12 denotes bearings (one of which is not visible) for the shaft 11. The shaft 11 has a rounded portion 13 which is supported in the right hand bearing 12 and rounded portions 22 and 33. A squared portion 16 is arranged between the rounded portions 13 and 22 and a squared portion 32 is arranged between the round portions 22 and 33.

14 denotes a gear which is loosely disposed upon the rounded portion 13 of the shaft 11 and is provided with a reverse clutch member 15. Upon the squared portion 16 of the shaft 11 is slidably disposed a clutch 17 having clutch members 18, 19 thereon. The said clutch member 17 may be shifted longitudinally upon the squared portion 16 of the shaft 11 by means of a forked arm 20 which embraces the clutch 17 between the members 18 and 19. The lower end of the fork 20 is fixed upon a sleeve 21 which is connected at its forward end by means of a stud 21ª to a link 21ᵇ. Upon the rounded portion 22 of the shaft 11 is loosely mounted a low-speed clutch 24 which is adapted to engage with the clutch member 19 of the clutch 17. Upon the opposite end of the rounded portion 22 of the shaft 11 is loosely disposed a gear 27ª having a second speed clutch 26 at its inner end. The gear 27ª and the clutch member 24 are maintained in position upon the rounded portion 22 of the shaft 11 by means of a sleeve 22ª, and collars 22ᵇ, 22ᶜ arranged thereon.

27 denotes a clutch slidably disposed upon the squared portion 32 of the shaft 11 and provided with clutch members 28, 28ª. The clutch member 28 is adapted to mesh with the second speed clutch 26 when the same is shifted upon the squared portion 32 of the shaft by means of the fork 30 which is provided at its lower end with a sleeve portion securely fixed upon a rod 31 arranged within the sleeve 21, and connected at its outer end by means of a fork connection 31ª to a link 31ᵇ.

35 denotes the high-speed gear which is loosely mounted upon the rounded portion 33 of the shaft 11 and provided with an internal clutch 34 which is adapted to mesh with the clutch member 28ª when the clutch 27 is shifted upon the squared portion 32 of the shaft 11.

40 denotes a jack shaft which is mounted to one side of the main shaft 11 and parallel thereto. The said shaft 40 is supported in bearings 40ª, and is provided, adjacent to its right-hand end, with a fixed reverse gear 47 in mesh with a pinion 47ª which meshes with the reverse clutch gear 14 formed as a part of the reverse clutch 15. Intermediate of its ends the jack shaft 40 is provided with an integral flange 46ª.

46 denotes a low-speed gear in mesh with a pinion 29 formed as a part of the first or low-speed clutch 24. The low-speed gear 46 is arranged upon jack shaft 40 at one side of the flange 46ª, and to the other side of said disk 46ª is arranged a second-speed gear 45 in mesh with the second speed clutch 27ª. The gears 45 and 46 are secured together and to the disk 46ª on the jack shaft 40 by means of bolts 45ª.

43 denotes a clutch member which is slidably disposed upon the left-hand end of the jack shaft 40. The left-hand end of said jack shaft 40 is squared and intermediate said clutch 43 and the gear 45 is disposed a coil spring 44 which serves to maintain the clutch 43 in engagement with the intermediate gear 41 loosely mounted upon the rounded left-hand end of the jack shaft 40 meshing with the high-speed gear 35 loosely mounted upon the rounded portion 33 of the main shaft 11.

50 denotes an extra shaft which is mounted to one side of the jack shaft 40 and supported in bearings 51, 51 arranged in the transmission casing 10. The said shaft 50 is connected at its right-hand end to a shaft section 50ª by means of a universal joint 50ᵇ.

53 denotes a gear adapted to mesh with the second speed gear 45. The said gear 53 is slidably mounted upon a squared portion 52 provided on the extra shaft 50. The said gear 53 is also provided with an integral collar 53ª having an annular groove 53ᵇ therein.

54 denotes a vertical shaft extending through the top of the transmission casing 10. The lower end of said shaft 54 is provided with a reduced portion 54ª which is adapted to fit in a socketed stud 60 having a reduced lower end 60ª supported in a bushing provided in the base of the transmission casing 10. The said shaft 54 is provided intermediate its ends with an offset portion in order to clear the clutch members 28, 28ª arranged upon the clutch 27.

55 denotes a lever which is fixed upon the upper projecting end of the shaft 54 and connected by means of a link 81 with an arm 80 fixed upon a transverse shaft 79 supported upon the longitudinal frame members of the vehicle.

56 denotes an arm formed integral with the shaft 54 and disposed directly below the top of the transmission casing 10. To the free end of said arm 56 is secured the end 56ª of a forked arm 57 which has its ends extending into the annular groove 53ᵇ arranged in the collar 53ª of the gear 53 mounted on the extra shaft 50. The shaft 54 is provided at its lower end with a short laterally projecting toe 58 which is adapted to engage with an upwardly extending lug 59ª arranged upon a lever 59 which is pivotally supported upon the stud 60 disposed in the bottom of the transmission casing 10.

The lever 59 is provided at one end with a forked member 63 which embraces the stem of a fork 62 having its bifurcated portion engaging an annular groove 43ª arranged upon the clutch member 43. The lower end of said fork 62 is fixed upon a shaft 61 which has its opposite end guided in bearings 60ᵇ extending from a plate 60ª secured upon the base of the transmission casing 10. The other end of the arm 59 is also provided with a fork member 64 which embraces a projection 65 depending from a fork 30 having its lower end fixed upon the shaft 31, and having its upper bifurcated end engaging the clutch 27 intermediate the members 28, 28ª.

Adjacent to the forward end of the frame is mounted a transverse hoisting shaft 75 which has its ends disposed in bearings 76, 76 mounted upon the side members of the frame.

77 denote drums secured upon the projecting ends of the hoisting shaft 75.

78 denotes a worm gear fixed upon the shaft 75 and meshing with a worm 78ª fixed upon the shaft section 50ª, which latter has its forward end supported in a bearing 50ᶜ extending from the under side of the frame.

79 denotes a transverse shaft mounted in bearings in front of the transverse hoisting shaft 75.

80 denotes an arm fixed upon said shaft 79 and connected by means of the link 81 with the free end of the lever 55 secured to the projecting end of the vertical shaft 54.

82 denotes a lever which is fixed to a projecting end of the shaft 79 and provided at its free end with a handle member 83. The said lever 82 is provided intermediate its ends with an offset portion 84.

90 denotes the usual transmission operating shaft which is mounted upon the forward end of the frame parallel with the shafts 75 and 79, and supported in bearings 91, 91 arranged upon the longitudinal side members of the frame. Upon the outer side of one of the frame members is bolted a segment 91ª within which is disposed a transmission operating lever 96 which is pivotally connected to the shaft 90 so as to oscillate in a direction parallel with the longitudinal axis of said shaft.

92 denotes a sleeve member surrounding the shaft 90 and provided at its forward end, within the segment, with a supplemental lever 96ª, and adjacent to its inner end with an arm 95 which is connected by the link 31ᵇ to the forward end of the shifting rod 31ª.

93 denotes a second sleeve surrounding the sleeve 92, and provided at its forward end within the segment with a supplemental lever 96ᵇ and adjacent to its inner end with an arm 94, which is connected by a link 21ᵇ with the stud 21ª on the tubular shifting rod 21.

The tubular shifting rod 21 controls the low and reverse speeds, and the solid rod 31, sliding within the tubular rod 21, controls the second and high speeds.

The operation of the apparatus is as follows: When the vehicle is in operation and power is transmitted from the engine to the driving wheels, the lever 82 is normally in a vertical position, thus permitting the operating lever 96 to be thrown forward or rearward within the segment in connection with the appropriate supplemental lever 96ª, 96ᵇ as may be desired, remembering that the supplemental lever 96ª controls the second and high-speed through the arm 95, link 31ᵇ, and rod 31, and the supplemental lever 96ᵇ controlling the low speed and the reverse through the sleeve 93, arm 94, link 21ᵇ and tubular rod 21. It will be understood that the lever 82, when in the horizontal or locking position, only prevents the high speed gear being connected with the hoisting mechanism and leaves the transmission mechanism free to be connected to the hoisting mechanism through the low speed, second speed and reverse speed. When the lever 82 is adjusted to its vertical position, the rod 81 is forced rearwardly and at the same time the lever 55 given a partial turn to the rear. As this occurs, the gear 53 will be released from its engagement with the second speed gear 45, and thus throw the entire hoisting mechanism out of mesh with the transmission and parts controlled by the driving shaft 11. At the same time, the clutch member 43 will be caused to engage with the clutch 42 under the influence of the coil spring 44 arranged upon the jack shaft 40 intermediate the second-speed gear 45, and said clutch member 43; the spring 44 being permitted to restore the clutch member 43 to its position in engagement with the clutch 42 by reason of the fact that the toe 58 on the lower end of the shaft 54 has been released of its engagement with the stud 59ª on the lever 59 and thus permit the said arm 59 to resume its neutral position under the influence of the spring 44. At the same time the opposite end of the lever 59, having an enlarged slot or opening, is accorded a certain amount of forward movement without disturbing the neutral position of the clutch 27 upon the squared portion 32 of the shaft 11. In order now to operate the hoisting mechanism comprising the shaft sections 50, 50ª, worms 78, 78ª, and shaft 75, and drums 77, thereon, it merely becomes necessary to turn down the lever 82 thereby locking the transmission lever 96 against the connection with the high speed gear. At the same time that the lever 82 is adjusted to its horizontal position, the lever 55 will be drawn forwardly and thereby partially rotate the arm 56, and fork 56ª connected thereto and cause the forward end 57 of said fork to shift the gear 53ª into engagement with the second speed gear 45 arranged upon the jack shaft 40. At the same time the toe 58 on the lower end of the shaft 54 will contact with the lug 59ª upon the lever 59 and cause one end of said lever 59 embracing the fork 62 to shift the clutch member 43 out of engagement with the intermediate gear 41 and hold the same out of engagement and against the tension of the spring 44 upon the jack shaft 40. At the same time as the toe 58 engages the lug 59ª upon the lever 59, the opposite forked end of said lever 59 will cause the fork 30 to be moved slightly to the rearward and at the same time cause the clutch 27 to be partly shifted upon the squared portion 32 of the main shaft 11, and the clutch member 28 to be withdrawn halfway from its engagement with the second speed clutch 26, the connection between the two being fully and operatively maintained. With the parts adjusted to the positions just described, the extra shaft 50, and the hoisting mechanism in gear therewith, will be driven on second speed.

If it is desired to operate the hoisting mechanism on the first speed, it merely becomes necessary to force the tubular rod 21 inwardly farther, and cause the fork 20 which embraces the clutch 17, to withdraw the clutch member 18 from its engagement with the reverse clutch 15, and force the clutch member 19 into engagement with the first speed clutch 24, whereupon power will be transmitted through the gear 29, gear 46, jack shaft 40, and gear 45 to the gear 53 on the extra shaft 50.

If it is desired to operate the hoisting mechanism with the first or reverse speed, the clutch 27 must be adjusted to its neutral position upon the squared portion 32 of the shaft 11 and the clutch member 28 wholly disengaged from the clutch member 26. Hereupon, the shifting rod 21 may be drawn forwardly, and the fork 20 which engages the clutch 17 caused to force the clutch member 18 into engagement with the reverse clutch 15, whereupon power is thence transmitted through the gears 14, 47ª, 47, jack shaft 40, gear 45, and gear 53 on the extra shaft 50.

Having thus described my said invention, what I claim and desire to secure by Letters Patent is:

1. In motor vehicles and the like, in combination, a transmission mechanism, speed-controlling means for said transmission mechanism, an extra shaft, a power transmitting member operatively connected thereto and adapted to be actuated thereby, means for driving said transmission mechanism, and means for rendering said extra shaft operative, and rendering said speed-controlling means inoperative as to certain of the gears of said transmission mechanism.

2. In motor vehicles and the like, in combination, a transmission mechanism, speed-controlling means for said transmission mechanism, an extra shaft, a power transmitting member operatively connected thereto and adapted to be actuated thereby, normally inoperative means for driving said transmission mechanism, and means for rendering said extra shaft operative and for locking said speed-controlling means whereby to prevent the same being actuated to render certain of the gears of said transmission mechanism operative.

3. In motor vehicles and the like, in combination, a transmission mechanism, speed-controlling means for said transmission mechanism, an extra shaft, a power transmitting member operatively connected thereto and adapted to be actuated thereby, means for simultaneously operatively connecting said extra shaft with said transmission member, and locking said speed-controlling means whereby to prevent the same being actuated to render certain of the gears of said transmission mechanism operative.

4. In motor vehicles and the like, in combination, a transmission mechanism, speed-controlling means for said transmission mechanism, an extra shaft, a power transmitting member operatively connected thereto and adapted to be actuated thereby, normally inoperative means for operatively connecting said extra shaft with said transmission mechanism, and means coöperating with said speed-controlling means for preventing the actuating thereof to render certain of the gears of said transmission mechanism inoperative.

5. In motor vehicles and the like, in combination, a transmission mechanism, speed-controlling means for said transmission mechanism, an extra shaft, a power transmitting member operatively connected thereto and adapted to be actuated thereby, means for operatively connecting said extra shaft with said transmission mechanism, and for positively locking said speed-controlling means, whereby to prevent the same being actuated to render one of the speed gears of said transmission mechanism inoperative.

6. In motor vehicles and the like, in combination, a transmission mechanism, speed-controlling means for said transmission mechanism, an extra shaft, a power transmitting member operatively connected thereto and adapted to be actuated thereby, means for operatively connecting said extra shaft with said transmission mechanism, and means for positively locking said speed-controlling means whereby to prevent the same being actuated to render the high speed gear of said transmission mechanism inoperative.

7. In motor vehicles and the like, in combination, transmission mechanism, an extra shaft, a power transmitting member operatively connected thereto and adapted to be actuated thereby, means for operatively connecting said extra shaft with said transmission mechanism, and means for simultaneously positively rendering one of the speed gears of said transmission mechanism inoperative.

8. In motor vehicles and the like, in combination, a transmission mechanism, speed-controlling means for said transmission mechanism, an extra shaft, a power transmitting member operatively connected thereto and adapted to be actuated thereby, a gear wheel rotatable with said extra shaft and slidably mounted thereon, and means for shifting said gear wheel into and out of engagement with one of the gear wheels of said transmission mechanism, and for preventing the actuating of said speed-controlling means in order to render certain of the gears of said transmission mechanism inoperative.

9. In motor vehicles and the like, in combination, a transmission mechanism, speed-controlling means for said transmission mechanism, an extra shaft, a power transmitting member operatively connected thereto and adapted to be actuated thereby, a gear wheel rotatable with said extra shaft and slidably mounted thereon, means for shifting said gear wheel into and out of engagement with one of the gear wheels of said transmission mechanism, and for positively locking said speed-controlling means whereby to prevent the same being actuated to shift the clutch controlling the high speed gear of the transmission mechanism.

10. In motor vehicles and the like, in combination, a transmission mechanism, an extra shaft, a power transmitting member operatively connected thereto and adapted to be actuated thereby, a gear wheel rotatable with said extra shaft and slidably mounted thereon, and means for shifting said gear wheel into and out of engagement with one of the gear wheels of said transmission mechanism, and simultaneously positively rendering inoperative the clutch controlling the high speed gear of the transmission mechanism.

11. In motor vehicles and the like, in combination, a transmission mechanism, a transmission lever controlling the speed changes thereof, an extra shaft, a power transmitting member operatively connected thereto and adapted to be actuated thereby, means for operatively connecting said extra shaft with said transmission mechanism, and means for positively preventing said lever from occupying its position corresponding to one of the changes of speed of the transmission mechanism.

12. In motor vehicles and the like, in combination, a transmission mechanism, a transmission lever controlling the speed changes thereof, an extra shaft, a power transmitting member operatively connected thereto and adapted to be actuated thereby, and means for operatively connecting said extra shaft with said transmission mechanism, and simultaneously positively preventing said lever from occupying its position corresponding to one of the changes of speed of the transmission mechanism.

13. In motor vehicles and the like, in combination, a transmission mechanism, a transmission lever controlling the speed changes thereof, an extra shaft, a power transmitting member positively connected thereto and adapted to be actuated thereby, means for operatively connecting said extra shaft with said transmission mechanism, and means for positively preventing said lever from occupying its position corresponding to the high speed of the transmission mechanism.

14. In motor vehicles and the like, in combination, a transmission mechanism, a transmission lever controlling the speed changes thereof, an extra shaft, a power transmitting member positively connected thereto and adapted to be actuated thereby, a gear wheel rotatable with said extra shaft and slidably mounted thereon, and means comprising an actuating lever for shifting said gear wheel into engagement with one of the gear wheels of said transmission mechanism, said actuating lever positively locking said transmission lever from occupying its position corresponding to one of the changes of speed of the transmission mechanism.

15. In motor vehicles and the like, in combination, a transmission mechanism, a transmission lever controlling the speed changes thereof, an extra shaft, a power transmitting member positively connected thereto and adapted to be actuated thereby, a gear wheel rotatable with said extra shaft and slidably mounted thereon, and means comprising an actuating lever for shifting said gear wheel into engagement with one of the gear wheels of said transmission mechanism, said actuating lever positively locking said transmission lever from occupying its position corresponding to one only of the changes of speed of the transmission mechanism.

16. In motor vehicles and the like, in combination, a transmission mechanism, speed-controlling means for said transmission mechanism, driving mechanism adapted to be actuated thereby, an extra shaft, a power transmitting member operatively connected thereto and adapted to be actuated thereby, means for driving said extra shaft from said transmission mechanism, and means for positively locking said speed-controlling means whereby to render certain of the speed gears of the transmission mechanism inoperative with respect to said driving mechanism.

17. In motor vehicles and the like, in combination, a transmission mechanism, driving mechanism adapted to be actuated thereby, an extra shaft, a power transmitting member operatively connected thereto and adapted to be actuated thereby, normally inoperative means for driving said extra shaft from said transmission mechanism, and means for rendering said first mentioned means operative and simultaneously positively rendering certain of the speed gears of the transmission mechanism inoperative with respect to said driving mechanism.

Signed at the city of New York, county of New York, in the State of New York, this ninth day of August, nineteen hundred and twelve.

FRANK MUELLER.

Witnesses:
CONRAD A. DIETEND,
LOUIS B. HASBROUCK.